United States Patent [19]

Ernst

[11] Patent Number: 4,506,844
[45] Date of Patent: Mar. 26, 1985

[54] SAFETY BELT EMERGENCY LOCKING RETRACTOR

[75] Inventor: Hans-Hellmut Ernst, Sulfeld, Fed. Rep. of Germany

[73] Assignee: Britax-Kolb GmbH & Co., Fed. Rep. of Germany

[21] Appl. No.: 551,945

[22] Filed: Nov. 15, 1983

[30] Foreign Application Priority Data

Nov. 20, 1982 [GB] United Kingdom ............... 8233187

[51] Int. Cl.³ ...................... A62B 35/02; B65H 75/48
[52] U.S. Cl. ...................... 242/107.4 A; 242/107.4 B; 242/107.4 C
[58] Field of Search ............... 242/107.4 C, 107.4 A, 242/107.4 B; 280/806; 297/478

[56] References Cited

U.S. PATENT DOCUMENTS

3,237,879  3/1966  Whittingham ............... 242/107.4 C
4,350,313  9/1982  Adomeit ..................... 242/107.4 C
4,470,557  9/1984  Ernst .......................... 242/107.4 C Primary Examiner—John M. Jillions
Assistant Examiner—Katherine Jaekel
Attorney, Agent, or Firm—Hayes, Davis & Soloway

[57] ABSTRACT

The main locking mechanism of an emergency locking retractor for a vehicle safety belt comprises teeth on the flanges of the spool on which the belt is wound, the spool being mounted in bearings arranged to permit limited movement in a direction perpendicular to the axis of rotation, between a position in which said teeth engage with complementary teeth on the frame of the retractor. In order to optimize the number of teeth which are in engagement with teeth on the frame when the spool is in its engaged position, the tips of the teeth on the frame members are located on a circle centered on the axis of the spool when the latter is in its released position and the locking face of each tooth facing away from the plane in which the axis of the spool moves between its engaged position and its released position is oriented at the same angle to the radial line from such tooth to the axis of the spool when in its engaged position as that between the locking face of each tooth on the discs and the corresponding radius thereof.

11 Claims, 14 Drawing Figures

SAFETY BELT EMERGENCY LOCKING RETRACTOR

This invention relates to an emergency locking retractor for a vehicle safety belt.

Patent Specification GB-A-1592713 discloses an emergency locking retractor comprising a pair of mutually parallel frame members, a spool comprising a shaft for receiving the belt and a respective disc adjacent to each end of the shaft, each disc having uniformly spaced locking teeth on its outer periphery, the spool being mounted on the frame members in bearings arranged to permit limited movement relative to the frame members, in a direction perpendicular to the axis of rotation, between a position in which said teeth engage with complementary teeth on the frame members to inhibit rotation of the spool, resilient means being arranged to bias the spool into its position of disengagement and actuating means being arranged to cause movement of the spool into its engaged position.

The retractor disclosed in the above cited specification suffers from the disadvantage that, when the spool is in its engaged position, not more than two teeth on each disc are in engagement with teeth on the frame. Consequently, the entire load imposed by the safety belt on the retractor is taken by a maximum of four teeth. As a consequence of this, it is necessary for both the discs and the frame members to be formed of a relatively hard material, such as hardened steel, which is both heavy and expensive. The present invention is concerned with the provision of a retractor which is not subject to these disadvantages.

According to the invention, in an emergency locking retractor of the foregoing type, the tips of the teeth on the frame members are located on a circle centered on the axis of the spool when the latter is in its released position and the locking face of each tooth facing away from the plane in which the axis of the spool moves between its engaged position and its released position is oriented at the same angle to the radial line from such tooth to the axis of the spool when in its engaged position as that between the locking face of each tooth on the discs and the corresponding radius thereof.

Preferably, the locking faces of all the teeth on the frame members facing towards the aforesaid plane, in which the axis of the spool moves, are parallel to said plane.

It is desirable for the troughs between adjacent teeth on the frame members to lie on a circle, of the same radius as the maximum radius of the spool, centered on the axis of the spool when it is in its fully engaged position. This avoids making any of the troughs unnecessarily deep since the tips of the teeth on the discs then reach the bottoms of the troughs simultaneously.

In one form of the invention, the discs of the spool are provided with flanges which project radially outwardly of the teeth so as to engage with side faces of the frame members to inhibit axial displacement of the spool. Alternatively, this axial displacement may be inhibited by providing a distance bar extending between the frame members so as to maintain them at their required spacing, the distance bar having perpendicularly extending side limbs which project radially inwardly of the teeth on the frame members so as to be engageable with the side faces of the discs.

The teeth on the spool may be of symmetrical trapezoidal shape. This has the advantage that, provided that the ends of the spool are otherwise symmetrical, the spool may be inserted into the frame members either way round, thus facilitating assembly.

The spool may comprise a one piece member, for example formed as a die casting. Alternatively, the shaft of the spool may be formed of extruded material with separately fabricated discs fitted thereto.

The teeth on the frame members may be formed at the inner ends of open-ended slots in which the spool is received. However, as an alternative, the teeth may form part of the edge of a respective closed aperture in each frame member completely surrounding the corresponding disc.

The frame members may comprise the side limbs of a unitary U-shaped frame. Alternatively, the frame members may be individually secured to, or may form part of, the body of a motor vehicle in which the retractor is to be used.

In order to reduce wear on the teeth as the spool moves repeatedly into and out of its engaged position during normal use (i.e. not under accident conditions), an additional tooth may be provided on one or both of the frame members with its abutment face formed of a soft resilient material such as plastics and spaced angularly in advance of the abutment faces of the other teeth. On occasions when the mechanism locks but there is insufficient load to compress the plastics material to bring the faces of the other teeth into engagement with the corresponding faces of teeth on the spool, there will be no wear on these teeth. On the other hand, under accident conditions, the resilient plastics tooth is compressed and does not take any significant load.

Embodiments of the invention will now be described, by way of example, with reference to the accompanying drawings, in which.

Figure 1:
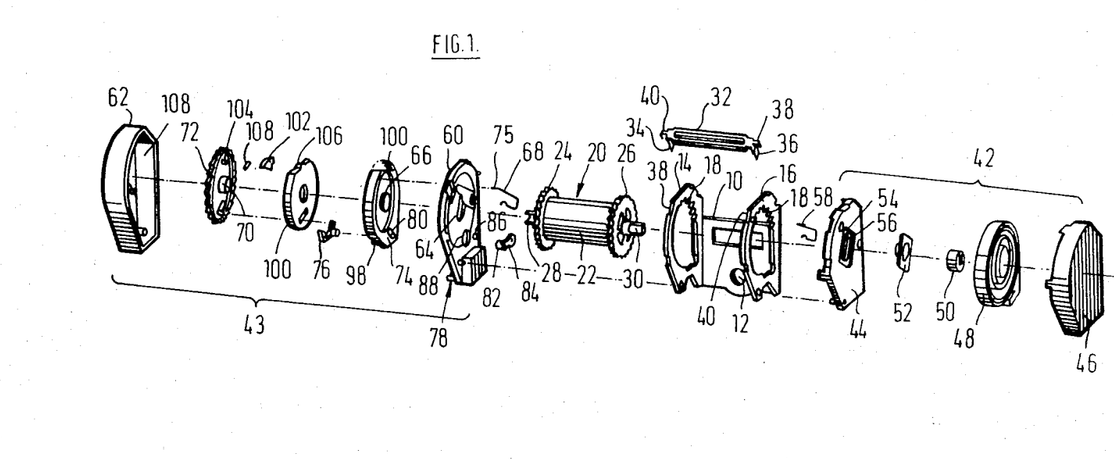
FIG. 1 is an exploded perspective view of an emergency locking retractor in accordance with the invention.

The retractor illustrated in FIG. 1 has a generally U-shaped frame 10, the base portion of which is provided with a hole 12 whereby the frame 10 may be secured to the body of a motor vehicle. The side limbs of the U-shape constitute substantially identical frame members 14 and 16 each of which contains a generally circular aperture having a respective toothed segment 18 forming part of its upper periphery. The bottoms of the circular apertures are enlarged by being squared-off so as to accommodate parts of the mechanism which will be described hereinafter.

A spool 20 is mounted in the frame 10. The spool 20 comprises a central shaft portion 22, on which a safety belt may be wound, two toothed discs 24 and 26, for engagement with the toothed segments 18 on the frame members 14 and 16 respectively, and two projecting stub axles 28 and 30.

A distance bar 32 having perpendicularly projecting side limbs 34 and 36, extends between notches 38 and 40 in the outer edges of the frame members 14 and 16 so as to maintain the required spacing therebetween. The end limbs 34 and 36 project beyond the edges of the openings in the frame members 14 and 16 so as to overlap the toothed discs 24 and 26 of the spool and prevent axial displacement thereof. In addition, the distance bar 32 has respective hook formations 38 and 40 on its two ends which serve to retain a retractor spring cassette 42 in engagement with the outer side face of the frame member 16 and a locking mechanism cassette 43 in engagement with the outer side face of the frame member 14.

The enclosure for the retractor spring cassette 42 comprises an end member 44, which abuts the frame member 16 and is engaged by the hook formation 38, together with a cover 46 which carries a stop (not shown) to which the outer end of a retractor spring 48 is secured. The inner end of the spring 48 is secured to a plastics boss 50 having a cylindrical outer surface and a slotted opening for engagement with the flattened end of the stub axle 30 of the spool 20. The axial length of the boss 50 is greater than the width of the spring 48 so as to be long enough for one end thereof to project into an opening in a plastics bearing plate 52 which is slidably mounted in an elongate recess 54 in the surface of the end plate 44. Centrally disposed within the recess 54 is an elongate slot 56 through which project the stub axle 30 and a boss on the bearing plate 52. The lengths of the recess 54 and the slot 56 are such that the bearing plate 52 can slide between a position in which the teeth on the disc 26 engage with the toothed segments 18 on the end plate 16 and a position in which they are clear of such engagement. A spring 58 engages with a formation on the bearing plate 52 to bias it into the disengaged position.

The locking mechanism cassette 43 is enclosed by an end plate 60, which abuts the outer face of the frame member 14 and is engaged by the hook formation 40 on the distance bar 32, together with a cover 62. The end plate 60 has an elongate slot 64 and a sliding bearing 66, which is spring biased away from the toothed segments 18 on the end plate 14 by a spring 68, in a similar manner to the corresponding components of the retractor spring cassette 42. However, in the locking mechanism cassette 43, the boss 50 is replaced by a stub axle 70 which is rigidly attached to a ratchet wheel 72, the stub axle 70 having a cylindrical outer surface for engagement in the bearing 66 and a slot for engagement with the flattened end portion of the stub axle 28 of the spool 20.

The sliding bearing 66 is an integral part of a control member 74 which is subject to an angular bias in the belt retractor direction by an extended limb 75 of the spring 68. A pawl 76 is pivotally mounted on the control member 74 so that it can be moved into engagement with the teeth of the ratchet wheel 72 by a conventional ball-in-saucer inertia sensing mechanism 78 mounted on the bottom of the end plate 60. The control member 74 also has an elongate slot 80 which engages with a projection 82 on a blocking pawl 84 which, in turn, is pivotally mounted on a pin 86 secured to the side of the end plate 60 facing the frame member 14. The end plate 60 has an elongate opening 88 through which the formation 82 projects.

FIGS. 2 to 5 show the locking mechanism schematically and some of the components illustrated therein have been broken away or modified as compared with FIG. 1, while others have been omitted, to enable the operation of the mechanism to be seen more clearly. It will be seen that the inertia sensing mechanism 78 comprises a carrier 90, which includes a saucer for a ball 92. The carrier 90 is secured to the end plate 60 and has a ball follower lever 94 pivotally mounted on a projecting part thereof. The follower lever 94 engages with the pawl 76. The direction of rotation to wind the safety belt on to the spool is anti-clockwise.

Figure 2:
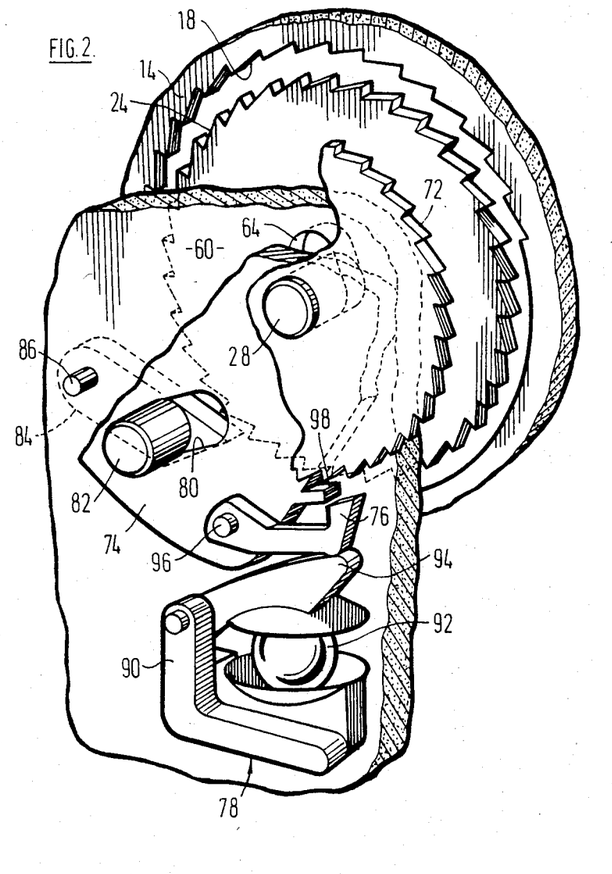
FIG. 2 is a schematic perspective diagram showing the inertia sensing mechanism in its released position.

The operation of the locking mechanism is as follows. When any horizontal acceleration to which the retractor is subject, is below the threshold level at which actuation of the locking mechanism is required, the ball 92 remains in the centre of its saucer and the pawl 76 is out of engagement with the ratchet wheel 72, as shown in FIG. 2.

Figure 3:
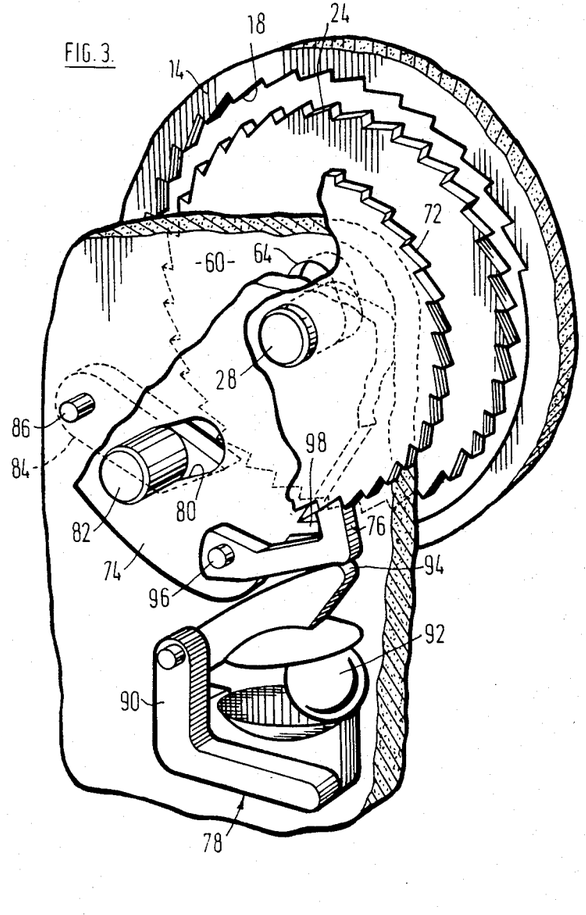
FIG. 3 is a view similar to FIG. 2 showing the sensing mechanism in a preliminary locking position.
Figure 4:
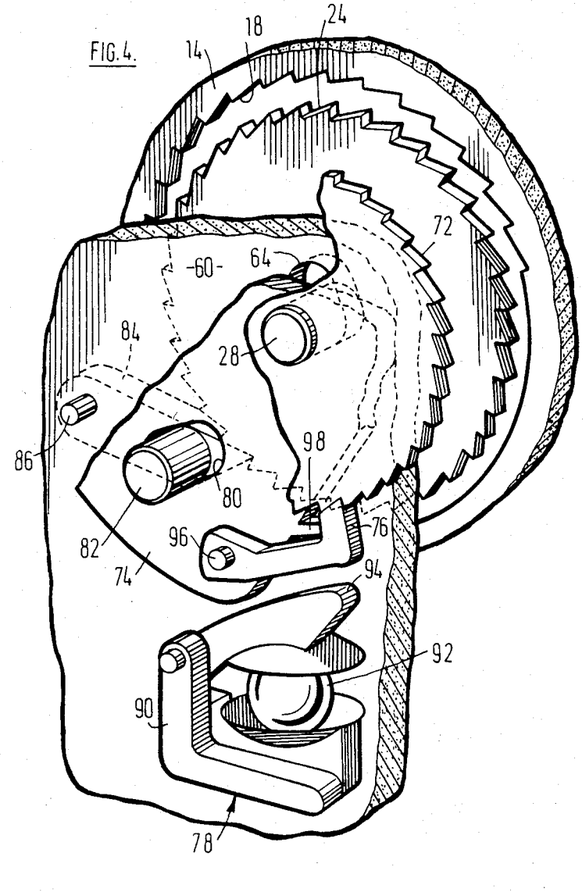
FIG. 4 is a view similar to FIGS. 2 and 3 showing the sensing mechanism in its fully blocked position prior to engagement of the main locking mechanism.
Figure 5:
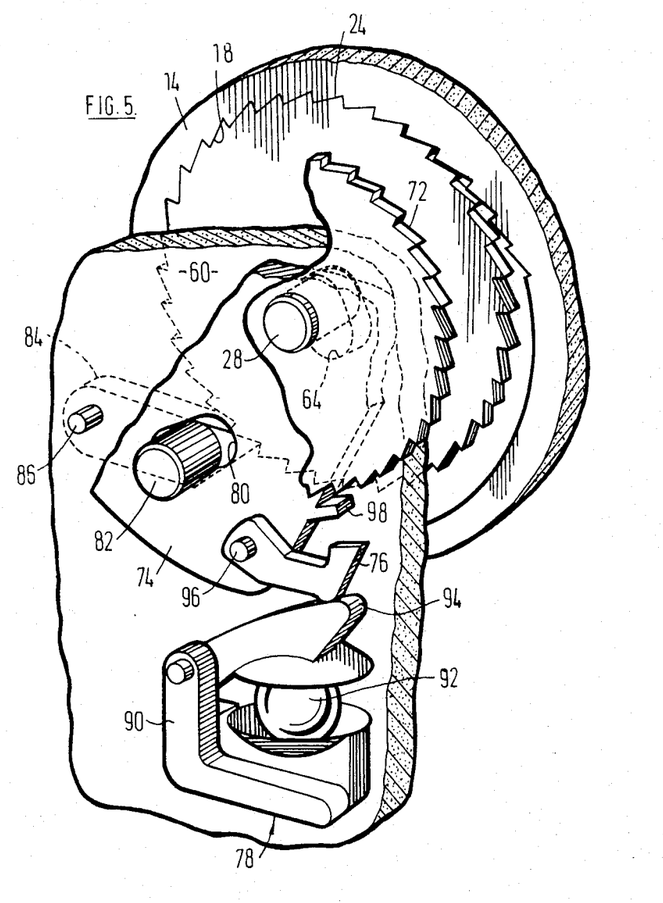
FIG. 5 is a view similar to FIGS. 2, 3 and 4 showing the mechanism in its fully locked position.

Turning to FIG. 3, when the above-mentioned threshold level of acceleration is exceeded, the ball 92 is displaced to nearer the edge of its saucer, lifting the lever 94 so that the pawl 76 is moved into engagement with the ratchet wheel 72. As already mentioned, the ratchet wheel 72 is fast with the spool 20 and consequently any withdrawal of the safety belt from the spool 20 will cause clockwise angular movement of the ratchet wheel 72 (as viewed in FIGS. 2 to 5) and this angular movement is transmitted by the pawl 76 to the control plate 74. As shown in FIG. 4, such angular movement of the control plate 74 results in the blocking pawl 84 pivoting into engagement with the toothed disc 24 of the spool 20 so as to block angular movement of the latter about its stub axles 28 and 30. Assuming that there is continued tension in the safety belt, the spool 20 pivots on the tip of the blocking pawl 84, the bearing plates 52 and 66 sliding along the slots 56 and 64 against the action of the springs 58 and 68 (FIG. 1) until the teeth of the discs 24 and 26 come into engagement with the toothed segments 18 on the frame members 14 and 16, as illustrated in FIG. 5. It will be appreciated that, once clockwise angular movement of the control plate 74 has commenced, the mechanism will move into and then remain in its fully locked position until tension in the safety belt is removed, even if the ball 92 has returned to its central position in its saucer.

The pivot axle 96 is relieved of the load imposed on the pawl 76 during locking by a stop 98 formed as a projection of control member 74 (FIG. 1) behind the tip of the pawl 76. As can best be seen from FIG. 4, the back of the tip of the pawl 76 engages with the stop 98 when the pawl has moved into its locking position. The pawl 76 is preferably a loose fit on its pivot axle 96 in order to facilitate this action.

Reverting to FIG. 1, the locking mechanism cassette 43 also includes a belt-pull-sensitive actuating mechanism which is of conventional type and which is not shown in FIGS. 2 to 5. Briefly, the belt-pull-sensitive locking mechanism consists of an inertia disc 100 which is pivotally mounted on the stub axle 70 of the ratchet wheel 72 and a pawl 102 which is pivotally mounted on a pin 104 secured to one side face of the ratchet wheel 72 adjacent to its periphery. The inertia disc 100 has a pin 106 which engages in a slot in the pawl 102 to cause the latter to move outwardly, if the inertia disc 100 lags behind the ratchet wheel 72, against the action of a spring 108, when the belt is being withdrawn from the spool 20. If the belt is accelerated in the withdrawal direction, the disc 100 has sufficient inertia to overcome the action of the spring 108 with the result that the pawl 102 moves outwardly into engagement with internal ratchet teeth 110 formed on a flange projecting from the control member 74 so that the latter is thereby coupled to the ratchet wheel 72. Continued withdrawal of the belt then causes angular movement of the control plate 74 and locking of the mechanism proceeds as described above with reference to FIGS. 4 and 5.

Figure 6:
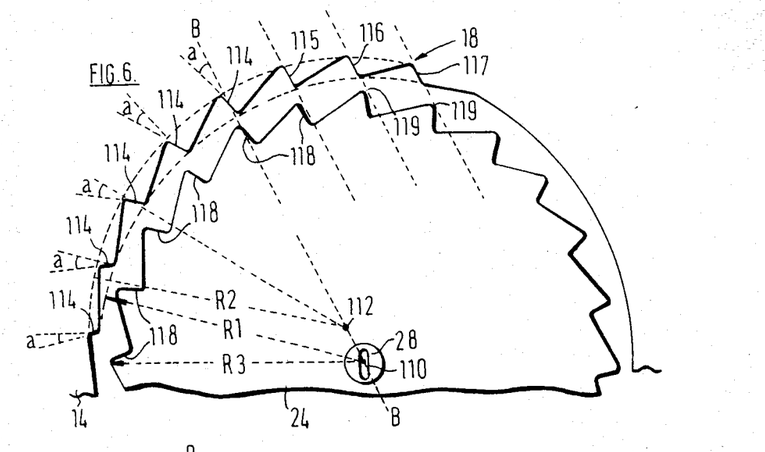
FIG. 6 is a schematic side view of one of the frame members and the corresponding locking disc showing the angular relationship between the teeth when the mechanism is in the released position.
Figure 7:
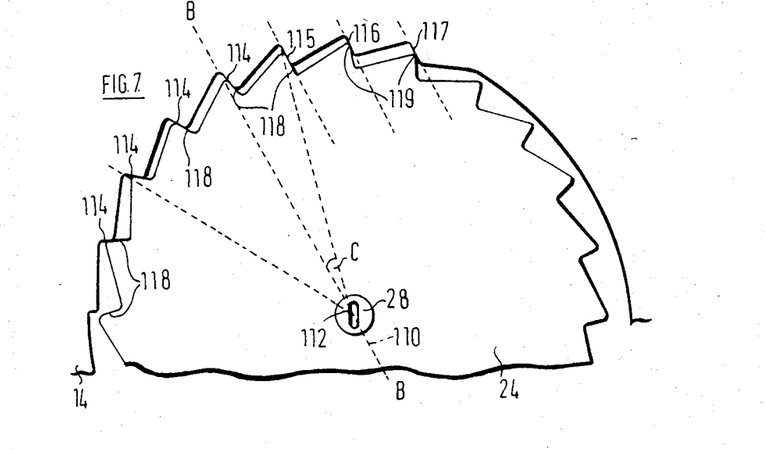
FIG. 7 is a schematic view, similar to FIG. 6, but showing the mechanism in a partially engaged position.

Referring now to FIGS. 6 and 7, it will be seen that, although the radially inner tips of the teeth of the segments 18 on the frame member 14 lie on a cirle of radius R1 centered on the axis 110 of the spool 20 when in its fully disengaged position, the radially outer troughs between these teeth lie on a circle of radius R2 equal to the maximum radius R3 of the disc 24 and having its center 112 coincident with the axis of the spool 20 when it has moved into its fully engaged position. Moreover, the locking faces 114 of the teeth of the segments 18 which are on the left-hand side of the plane B—B (as viewed in FIGS. 6 and 7), are all disposed at the same angle a to the corresponding radii of this second circle at the adjacent troughs between the teeth. On the other hand the locking faces 115, 116 and 117 of the teeth on the right-hand side of the plane B—B are all parallel to this plane. The effect of this is that the locking faces 114 are all parallel to the corresponding locking faces 118 on the toothed disc 24. Since the angle c between the plane B—B and the radial line from the center 112 to the tooth face 115 is equal to the angle a, this tooth face 115 is also parallel to the corresponding locking face 118. The result is that, as the spool 20 moves into its engaged position, all of the locking faces 114 and 115 come into full face engagement with the corresponding locking faces 118 on the toothed disc 24. At the same time, the faces 116 and 117 are immediately engaged by the tips 119 of the corresponding teeth on the toothed disc, these tips 119 sliding over the faces 116 and 117 as the spool 20 moves towards its fully engaged position. A similar result is achieved with the disc 26 at the other end of the spool. As a consequence, the load carried by each individual tooth is minimised, with the result that both the discs 24 and 26 and the frame members 14 and 16 can satisfactorily be formed of a softer material than has been customary hitherto.

Figure 8:
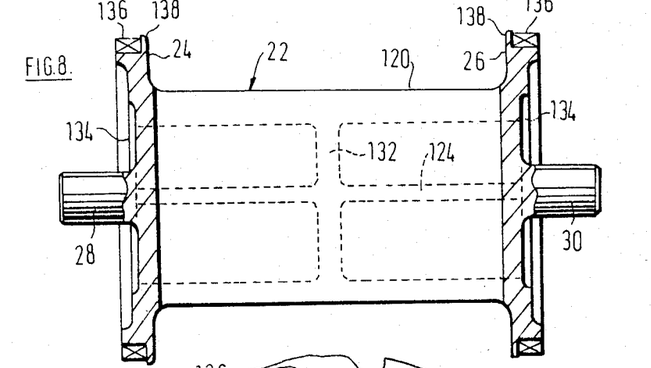
FIG. 8 is a longitudinal sectional view of a one-piece spool for use in the embodiment illustrated in FIG. 1.
Figure 9:
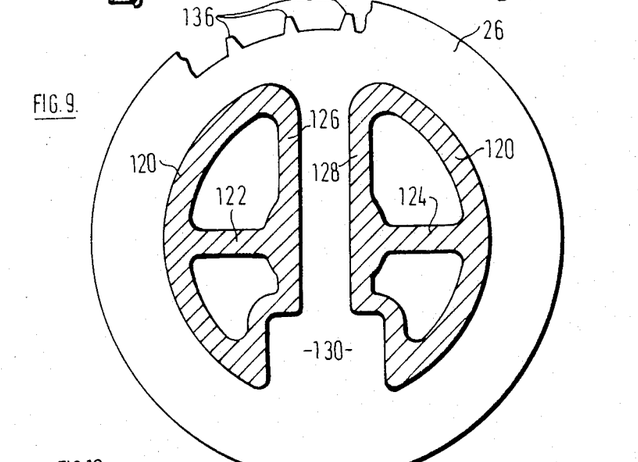
FIG. 9 is a cross-sectional view taken on the line 9—9 on FIG. 8.

One consequence of the acceptability of forming the lock locking discs 24 and 26 of a relatively soft material is that it is feasible to form the entire spool 20 as a single die casting. Such a spool is shown in FIGS. 8 and 9. The shaft portion 22 comprises a hollow cylinder 120 having two dimetrically opposed radial webs 122 and 124 coupled to transverse webs 126 and 128 which bound a central slot extending dimetrically across the entire shaft portion 22 for receiving the inner end of the webbing of the safety belt. One end of the slot has a broadened portion 130 of rectangular cross-section for receiving a locking bar of T-shaped cross-section (not shown) inserted through a loop formed in the end of the webbing. Two central semi-circular reinforcing webs, one of which can be seen at 132 in FIG. 8, are disposed one on each side of the central slot and interconnect the cylinder 120 and the webs 122, 124 and 126.

Respective disc portions 24 and 26 are formed on each end of the shaft portion 22. Each of the disc portions 24 and 26 has a circular recess 134 from which apertures communicate with the cavities within the cylindrical shaft portion 22. Teeth 136 are formed on the peripheries of the disc portions 24 and 26. As can be seen from FIG. 9, these teeth 136 are of symmetrical trapezoidal shape with the result that the spool 20 can be inserted into the frame 10 either way round with equally satisfactory result, thereby simplifying assembly. Flanges 138 project outwardly beyond the teeth 136 and help to prevent axial movement of the spool 20 relative to the frame members when the spool 20 is in the locked position.

Figure 10:
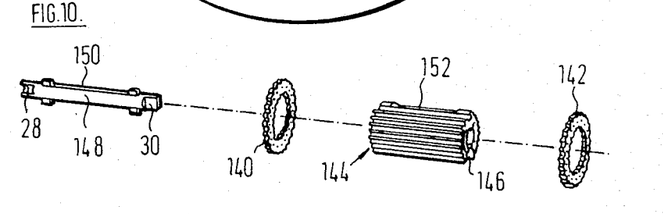
FIG. 10 is a perspective view of an alternative form of spool for use with the embodiment illustrated in FIG. 1.

An alternative form of spool, constructed from extruded material, is shown in FIG. 10. The toothed discs take the form of annular members 140 and 142, their outer peripheries having teeth to engage with the toothed segments 18 on the frame and their inner peripheries having teeth which engage with grooves formed from an extruded cylindrical shaft member 144. The shaft member 144 has a slot 146 extending along its entire length from its periphery to its centre for reception of a bar 148 which has a narrower slot 150 through which the belt is threaded and the end portions of which form the stub axles 28 and 30. The belt projects through a narrow slot 152 in the member 144 opposite the slot 146.

Figure 11:
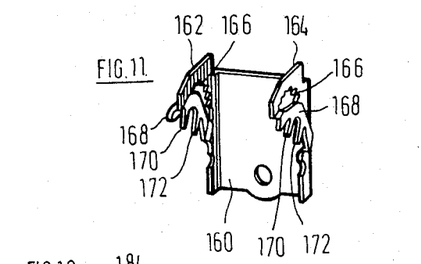
FIG. 11 is a perspective view of an alternative frame to that illustrated in FIG. 1.

FIG. 11 illustrates an alternative frame 160 to the frame 10 illustrated in FIG. 1. The frame 160 is also generally U-shaped, having side frame members 162 and 164 each of which carries a toothed segment 166 similar to the toothed segments 18 of FIG. 1. However, the bottom part of each side frame member 162 and 164 is omitted. Instead, the outer end of each of the toothed segments 166 is connected to the base portion of the frame member 160 by a respective offset reinforcing portion 168 which carries a pair of downwardly extending parallel fingers 170, 172 to define open-ended slots for receiving the stub axles 28 and 30 of the spool. When the spool 20 is in place, the offset reinforcing portions 168 confront the outer end faces of the toothed discs 24 and 26 and inhibit axial movement of the spool 20. Movement of the stub axles 28 and 30 out of the slots between the fingers 170 and 172 is inhibited by the bearing plates 52 and 56 of the two cassettes 42 and 43. It will be appreciated that since these bearing plates prevent the spool from ever making contact with the bottom edges of the openings in the side members 14 and 16 of the frame 10 illustrated in FIG. 1, the omission of such bottom edges has no effect on the operation of the mechanism.

Figure 12:
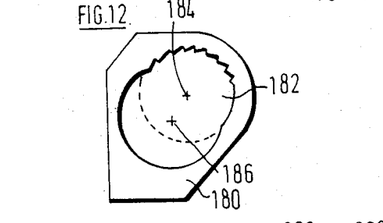
FIG. 12 is a side view of a further alternative frame.
Figure 13:
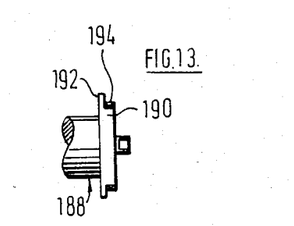
FIG. 13 is a side view of one end of a modified spool for use with the frame illustrated in FIG. 12.

FIGS. 12 and 13 illustrate another alternative in which the frame itself resists axial movement of the spool. The frame 180, illustrated in FIG. 12, is similar to the frame 10 illustrated in FIG. 1 except that the basically circular opening 182 in the side members of the frame, which is centred on the axis 184 of rotation of the spool when in its released position is enlarged by a second circular portion of larger radius centred on the point 186. The spool 20 is replaced by a spool 188, the toothed discs 190 of which have flanges 192 projecting radially outwardly beyond their teeth 194 to a greater extent than the flanges 138 of the spool 20. The diameter of that part of each of the apertures of the frame which is centred on the point 186 is greater than that of the flanges 192 while the diameter of the part centred on the released position 184 of the spool axis is between that of the flanges 192 and that of the toothed portion 194. Consequently, during assembly, the spool 188 can be inserted into the frame 180 by aligning its axis with the centre 186 but, after assembly movement of the axis of the spool to the point 186 is prevented by the sliding bearing plates 52 and 66, with the result that the spool 188 is retained against axial movement relative to the frame 180.

Figure 14:
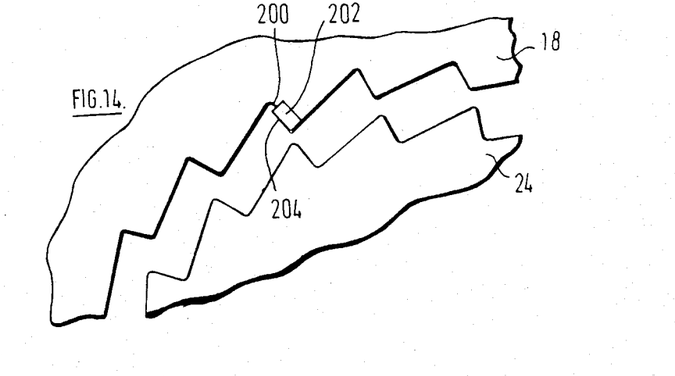
FIG. 14 is a fragmentary side view of part of one of the frame members and the corresponding disc of the spool, illustrating a modification to reduce tooth wear.

Finally, although ideally, in accordance with the invention, the teeth of the toothed segments 18 (FIG. 1) and 166 (FIG. 11) are so arranged that each tooth comes into engagement with a corresponding tooth of the spool simultaneously, in practice, manufacturing tolerances make this simultaneous engagement difficult to achieve with the result that one of the teeth is frequently subject to more wear than the others during normal use (i.e. under non-accident conditions). Referring to FIG. 14, this difficulty can be overcome by cutting away the bearing face 200 of one of the teeth of each toothed segments 18 in order to receive an insert 202 of resilient plastics material which can conveniently be a projection formed integrally with the end members 44 and 60 of the two cassettes 42 and 43. The insert 202 has its bearing surface 204 slightly proud of the surface 200. The result is that the resilient plastics insert 202 is always the first part of the toothed segments 18 to come into contact with the teeth of the discs 24 and 26 and therefore takes all the wear due to operation of the locking mechanism during normal acceleration, gentle braking and cornering of the vehicle in which the retractor is fitted. Under accident conditions, the insert 202 is compressed sufficiently for the remaining teeth of the segments 18 to come into engagement with the teeth of the discs 24 and 26 in order to take full crash load.

It will be appreciated that an insert similar to the insert 202 may be provided on the frame illustrated in FIGS. 11 and 12. It will also be appreciated that the insert 202 can be used in conjunction with a spool having trapezoidal teeth as illustrated in FIG. 9.

What is claimed is:

1. An emergency locking retractor comprising a pair of mutually parallel frame members, a spool comprising a shaft for receiving a safety belt, a disc, having teeth on its periphery, mounted adjacent to each end of the shaft, complementary teeth on the frame members, bearings mounting the spool on the frame members so as to permit limited translational movement of the spool relative to the frame members in a direction perpendicular to the axis of rotation of the spool between a disengaged position and an engaged position in which said teeth of said discs engage with said complementary teeth on the frame members to inhibit rotation of the spool, resilient means being arranged to bias the spool into its disengaged position and actuating means being arranged to cause movement of the spool into its engaged position, wherein the tips of the teeth on the frame members are located on a circle centered on the axis of the spool when the latter is in its disengaged position, and the locking face of each tooth facing away from the plane in which the axis of the spool moves between its engaged position and its disengaged position is oriented, relative to the radial line from that tooth face to the axis of the spool when in its engaged position, at an angle which is the same as the angle between the locking face of each tooth of the discs and the corresponding radial line from each said tooth of the discs to the center of the disc.

2. A retractor according to claim 1, wherein all the teeth on the frame members which faces towards the plane in which the axis of the spool moves, have their locking faces parallel to said plane.

3. A retractor according to claim 1, wherein the troughs between adjacent teeth on the frame members lie on a circle, of the same radius as the maximum radius of the spool, and centered on the axis of the spool when it is in its fully engaged position.

4. A retractor according to claim 1, wherein the discs of the spool are provided with flanges which project radially outwardly of the teeth of the discs so as to engage with side faces of the frame members to inhibit axial displacement of the spool.

5. A retractor according to claim 1, further comprising a distance bar extending between the frame members so as to maintain them at their required spacing, the distance bar having perpendicularly extending side limbs which project radially inwardly of the teeth on the frame members so as to be engageable with the side faces of the discs in the event of axial displacement of the spool.

6. A retractor according to claim 1, wherein the teeth on the spool are of symmetrical trapezoidal shape.

7. A retractor according to claim 1, wherein the spool comprises a one-piece member formed as a die-casting.

8. A retractor according to claim 1, wherein the shaft of the spool is formed of extruded material with separately fabricated discs fitted thereto.

9. A retractor according to claim 1, wherein the teeth on the frame members are formed at the inner ends of open-ended slots in which the spool is received.

10. A retractor according to claim 1, wherein the teeth form part of the edge of a respective closed aperture in each frame member completely surrounding the corresponding disc.

11. A retractor according to claim 1, wherein a tooth on at least one of the frame members is provided with an abutment face formed of a soft resilient material and spaced angularly in advance of the locking faces of the other teeth.

* * * * *